US012717515B2

(12) United States Patent
Das et al.

(10) Patent No.: US 12,717,515 B2
(45) Date of Patent: Aug. 25, 2026

(54) CONFIGURABLE DATA PLACEMENT WITH VARIABLE PLANE PROGRAMMING

(71) Applicant: Microchip Technology Incorporated, Chandler, AZ (US)

(72) Inventors: Saswati Das, Milpitas, CA (US); Nian Niles Yang, Mountain View, CA (US); Srinivas Yelisetti, Fremont, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/963,290

(22) Filed: Nov. 27, 2024

(65) Prior Publication Data

US 2026/0029951 A1 Jan. 29, 2026

Related U.S. Application Data

(60) Provisional application No. 63/676,721, filed on Jul. 29, 2024.

(51) Int. Cl.
*G06F 3/06* (2006.01)

(52) U.S. Cl.
CPC .......... *G06F 3/0656* (2013.01); *G06F 3/0604* (2013.01); *G06F 3/0659* (2013.01); *G06F 3/0679* (2013.01)

(58) Field of Classification Search
CPC .... G06F 3/0656; G06F 3/0604; G06F 3/0659; G06F 3/0679
See application file for complete search history.

(56) References Cited

U.S. PATENT DOCUMENTS

| | | | | |
|---|---|---|---|---|
| 9,619,321 | B1 * | 4/2017 | Haratsch | G06F 3/064 |
| 2010/0058003 | A1 * | 3/2010 | Goto | G11C 16/10 711/E12.001 |
| 2015/0169450 | A1 * | 6/2015 | Traut | G06F 12/0813 711/142 |
| 2016/0034352 | A1 * | 2/2016 | Michael | G06F 11/1064 714/773 |
| 2019/0258404 | A1 | 8/2019 | Rajwade et al. | |

(Continued)

FOREIGN PATENT DOCUMENTS

WO 2021216125 A1 10/2021

OTHER PUBLICATIONS

International Search Report and Written Opinion for PCT Application No. PCT/US2024/057889 (Dated Apr. 16, 2025).

*Primary Examiner* — Ryan Bertram
(74) *Attorney, Agent, or Firm* — Hovey Williams LLP

(57) ABSTRACT

A data storage system includes a memory device and a controller. The memory device includes a set of planes and a wordline including a set of pages. The controller includes a first and second minimum write cache control buffer (mWCCBs), processor(s), and a memory. The memory includes instructions, that when executed the processor(s), cause the processor(s) to: determine that an amount of outstanding data of a data stream is not sufficient to occupy the set of planes; store a first portion of the outstanding data in the first mWCCB; release the first portion to the memory device; in coordination with the release of the first portion of the outstanding data, store a second portion of the outstanding data in the second mWCCB; release the second portion to the memory device; and write the first and second portions of the outstanding data to a subset of the set of pages.

20 Claims, 8 Drawing Sheets

(56) References Cited

U.S. PATENT DOCUMENTS

| | | | | |
|---|---|---|---|---|
| 2020/0019340 | A1* | 1/2020 | Wu | G06F 12/0246 |
| 2020/0125294 | A1* | 4/2020 | Parker | G06F 12/0871 |
| 2021/0064289 | A1* | 3/2021 | Kanno | G06F 3/0604 |
| 2021/0064290 | A1* | 3/2021 | Kanno | G06F 3/0604 |
| 2021/0334201 | A1* | 10/2021 | Bennett | G06F 11/3037 |
| 2023/0107227 | A1* | 4/2023 | Tan | G06F 12/0246<br>711/154 |
| 2023/0143181 | A1* | 5/2023 | Tan | G06F 3/0656<br>711/103 |
| 2023/0305748 | A1* | 9/2023 | Ueki | G06F 3/0616 |
| 2024/0054971 | A1* | 2/2024 | Cariello | G11C 16/102 |

* cited by examiner

600

| | P0 | P1 | P2 | P3 |
|---|---|---|---|---|
| Lower | 1 | 2 | 3 | 4 |
| Middle | 5 | 6 | 7 | 8 |
| Upper | 9 | 10 | 11 | 12 |

| | P0 | P1 | P2 | P3 |
|---|---|---|---|---|
| Lower | 1 | 2 | 7 | 8 |
| Middle | 3 | 4 | 9 | 10 |
| Upper | 5 | 6 | 11 | 12 |

| | | | | |
|---|---|---|---|---|
| Top | P0 | P1 | P2 | P3 |
| Upper | P0 | P1 | P2 | P3 |
| Middle | P0 | P1 | P2 | P3 |
| Lower | P0 | P1 | P2 | P3 |

CONFIGURABLE DATA PLACEMENT WITH VARIABLE PLANE PROGRAMMING

CROSS-REFERENCE TO RELATED APPLICATIONS

The current patent application claims the benefit under 35 U.S.C. § 119(e) of the priority date of U.S. Provisional Application Ser. No. 63/676,721; titled "CONFIGURABLE DATA PLACEMENT WITH VARIABLE PLANE PROGRAMMING"; and filed Jul. 29, 2024. The Provisional Application is hereby incorporated by reference, in its entirety, into the current patent application.

TECHNICAL FIELD

Various examples of the present disclosure relate to configurable data placement with variable plane programming in a multi-stream memory device.

BACKGROUND

A typical solid state drive (SSD) controller may utilize fixed multi-plane programming to store data in an SSD. Fixed multi-plane programming requires the controller to accumulate enough data to fill all pages of a wordline before issuing a write command. The accumulated data may be stored in a buffer. In multi-stream SSDs, there may be up to thirty-two (32) active streams sending data to be written to the SSD. Each data stream may have different write frequencies, lifetimes, and different amounts of data and may be separated by the SSD controller into virtual blocks. Recent increases in the data storage capacity of SSDs, such as an increased number of planes in NAND storage media, has led to increased buffer size for multi-plane programming, which may lead to deadlock when accumulating enough data to fill all pages of a wordline and may require a large on-chip capacitance in order to save a large amount of data during a sudden power loss.

This background discussion is intended to provide information related to the present invention which is not necessarily prior art.

SUMMARY OF THE INVENTION

According to various examples of the present disclosure, a system may include a memory device and a controller. The memory device may include a set of planes and a wordline. The wordline may include a set of pages spanning the set of planes. The controller may include a first minimum write cache control buffer (mWCCB) and a second mWCCB, at least one processor, and a memory. The memory may include instructions stored thereon, that when executed by at least one processor, cause the at least one processor to: determine that an amount of outstanding data of a data stream is not sufficient to occupy the set of pages; store a first portion of the outstanding data in the first mWCCB; release the first portion of the outstanding data from the first mWCCB to the memory device; in coordination with the release of the first portion of the outstanding data, store a second portion of the outstanding data in the second mWCCB; release the second portion of the outstanding data from the second mWCCB to the memory device; and based on the determination that the amount of outstanding data is not sufficient to occupy the set of pages, write the first and second portions of the outstanding data to a first subset of the set of pages.

According to various examples of the present disclosure, a computer-implemented method may include: determining an amount of outstanding data of a data stream is not sufficient to occupy a set of pages of a wordline of a memory device, said set of pages spanning a set of planes of the memory device; storing a first portion of the outstanding data in a first minimum write cache control buffer (mWCCB); releasing the first portion of the outstanding data from the first mWCCB to the memory device; in coordination with the release of the first portion of the outstanding data, store a second portion of the outstanding data in a second mWCCB; releasing the second portion of the outstanding data from the second mWCCB to the memory device; and based on the determination that the amount of outstanding data is not sufficient to occupy the set of planes, writing the first and second portions of the outstanding data to a first subset of the set of pages.

According to various examples of the present disclosure, non-transitory computer readable media may include instructions stored thereon, that when executed by at least one processor, cause the at least one processor to: determine an amount of outstanding data of a data stream is not sufficient to occupy a set of pages of a wordline of a memory device, said set of pages spanning a set of planes of the memory device; store a first portion of the outstanding data in a first minimum write cache control buffer (mWCCB); release the first portion of the outstanding data from the first mWCCB to the memory device; in coordination with the release of the first portion of the outstanding data, store a second portion of the outstanding data in a second mWCCB; release the second portion of the outstanding data from the second mWCCB to the memory device; and based on the determination that the amount of outstanding data is not sufficient to occupy the set of planes, write the first and second portions of the outstanding data to a first subset of the set of pages.

This summary is not intended to identify essential features of the examples, and is not intended to be used to limit the scope of the claims. These and other aspects of the present examples are described below in greater detail.

BRIEF DESCRIPTION OF THE DRAWINGS

FIG. 6A illustrates an example triple level cell (TLC) multi-plane wordline of the system of FIG. 1;

FIG. 6B illustrates another example triple level cell (TLC) multi-plane wordline of the system of FIG. 1;

Figure 1:
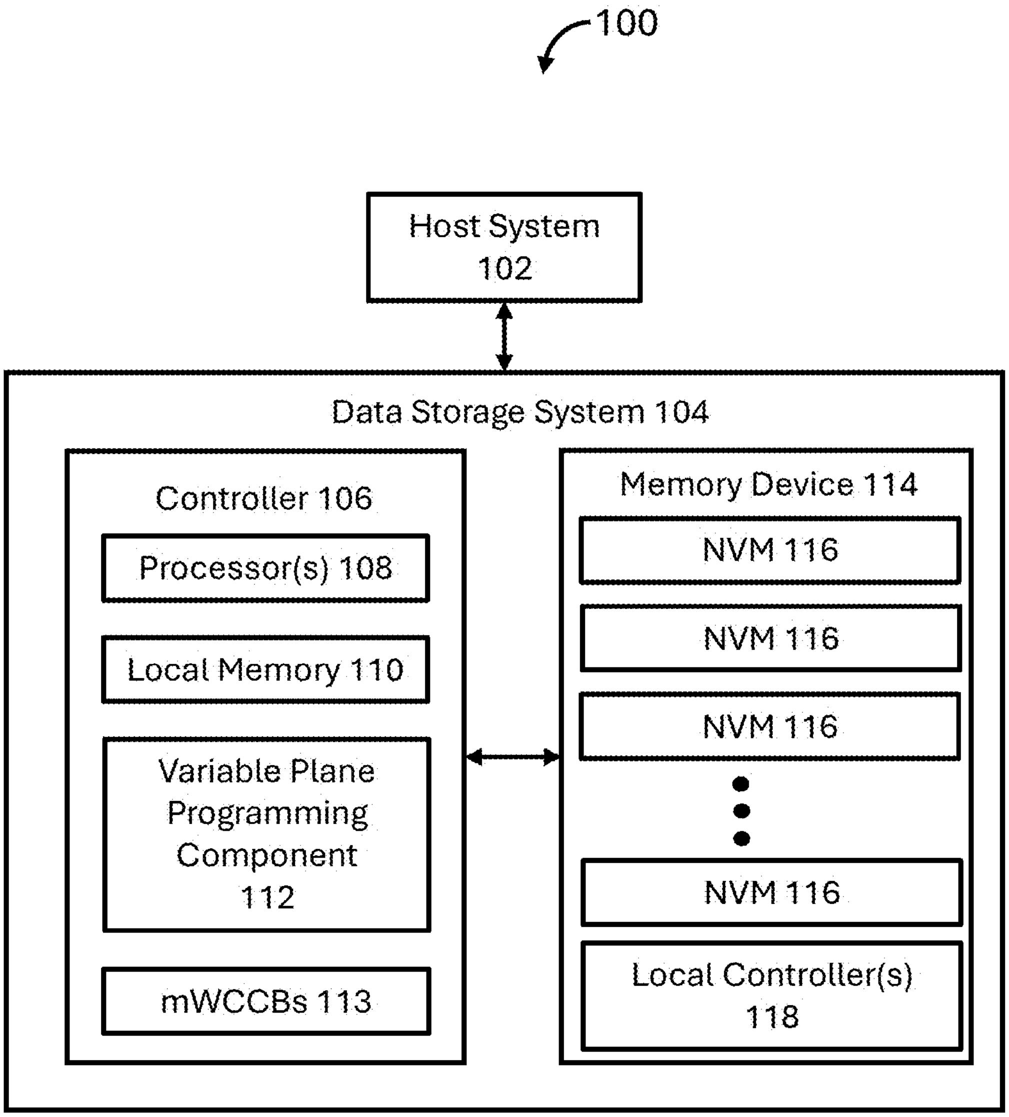
FIG. 1 illustrates an example system for configurable data placement with variable plane programming.

Unless otherwise indicated, the figures provided herein are meant to illustrate features of examples of this disclosure. These features are believed to be applicable in a wide variety of systems comprising one or more examples of this disclosure. As such, the figures are not meant to include all conventional features known by those of ordinary skill in the art to be required for the practice of the examples disclosed herein.

DETAILED DESCRIPTION

In the following detailed description, reference is made to the accompanying drawings, which form a part hereof and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure. Unless clearly understood or expressly identified otherwise, structures, materials, procedures, operations, and other aspects described in the context of one example may be incorporated into other examples.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

Terms of relative location and direction (e.g., above, below, left, right, upper, lower) may be used to facilitate the present descriptions of examples with reference to the figures, but unless clearly understood or expressly identified otherwise, these terms are not meant to be limiting with regard to location, direction, or overall orientation, and may, for example, change as a result of a change in overall orientation.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, operations, features, functions, or the like.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples.

In various examples of the present disclosure, a data storage system may include a memory device. The memory device may store data. The data may include data of a plurality of data streams. The data storage system may be connected to a host system. In various examples, the data storage system may be connected to the host system by wired or wireless means. In various examples, the data storage system may be connected to more than one host system, such as in a multi-tenant environment, without limitation.

The data storage system may include a controller and the memory device. The controller may be operable to manage storage and retrieval of data to and from the memory device. The host system may send data to the data storage system for storage in the memory device. The host system may send a read request to the data storage system. The read request may indicate data to be retrieved from the memory device and sent back to the host system. The controller may process the read request and retrieve the data from the memory device.

In various examples, the memory device may be a solid state drive (SSD) including a plurality of non-volatile memory (NVM) media (e.g., NAND-based memory media) for data storage. In various examples, the NVM media may include chip enable (CE) ports which may also be referred to as targets. Examples may be used in single-level cell (SLC) systems, multiple-level cell (MLC) systems, triple-level cell (TLC) systems, and quadruple-level cell (QLC) systems. Applications include high performance computing (HPC), data transfer for AI, and data center solutions (DCS).

The NVM media may respectively include a local controller and a plurality of die. In various examples, the NVM media may respectively include two (2), four (4), eight (8), sixteen (16), twenty four (24), thirty two (32), or more die, without limitation. Each die may correspond to a logical unit (LUN). Each LUN may include a plurality of planes. Each LUN may include, for example, four (4), six (6), eight (8), or more planes, without limitation. Each plane may include a cache register, a page register, and a plurality of physical memory blocks. When data is written to or retrieved from the NVM media, the data may be temporarily stored in one of the cache register and the page register. Each physical memory block may include a plurality of pages. The cache register and the page register may respectively have an equivalent data capacity of one page. Accordingly, data to be written to one page may be temporarily stored in the cache register while data to be written to another page may be temporarily stored in the page register. Data to be read may be retrieved and temporarily stored in one of the cache register and the page register while data to be written to a particular page may be stored in the other of the cache register and the page register. Accordingly, the cache register and page register enable double buffering of data to reduce data programming and read times. Each page may include a plurality of cells. Data bits may be written to the plurality of cells on a page-by-page basis. Data may be erased from the plurality of cells on a physical memory block basis.

The NVM media may additionally include a plurality of wordlines and a plurality of bit lines. Each wordline may correspond to physical locations of a set of pages. Each set of pages may span multiple planes. As used herein, a wordline may include a set of pages spanning a plurality of planes. Each bit line may correspond to physical locations of a string of cells. A physical address of a particular cell may correspond to an intersection of a particular wordline and a particular bit line. Data may be written to the particular cell by activating the particular wordline and the particular bit line. In various examples, each wordline may include at least one page from each plane of the NVM media.

In various examples, the cells may include single-level cells (SLCs), multi-level cells (MLCs), triple-level cells (TLCs), and/or quadruple-level cells (QLCs), without limitation. Accordingly, the wordlines may be SLC wordlines, MLC wordlines, and/or QLC wordlines, without limitation. In an example (e.g. the wordline 610 of FIG. 6B), a TLC wordline may span four (4) planes. The four (4) planes may respectively include a lower page, a middle page, and an upper page of the wordline. The lower page, middle page, and upper page may correspond to TLCs. The TLC wordline may be activated to write data to each of the upper, middle, and lower pages of each of the four (4) planes. Accordingly, an SLC wordline may be associated with one (1) page from each plane, an MLC wordline may include two (2) from each plane, a TLC wordline may include three (3) pages from each plane, and a QLC wordline may include four (4) pages from each plane.

The controller may receive outstanding data associated with respective data streams. In various examples, outstanding data may be received from any number of data streams, such as four (4), eight (8), twelve (12), sixteen (16), twenty-four (24), thirty-two (32), or sixty-four (64) data streams, without limitation. Each data stream may provide different amounts of outstanding data to be stored in the memory device. The controller may identify outstanding data of a given data stream based on respective identifiers (IDs) included in the outstanding data. The controller may identify an amount of outstanding data for each of the data streams. In various examples, the controller may determine whether there is enough outstanding data for a given data stream to fill a set of pages of a particular wordline. If the controller determines that there is enough outstanding data for the given data stream to fill the set of pages of the particular wordline, the controller may issue a random data input command to process the outstanding data. After issuing the random data input command, the controller may issue a multi-plane full sequence program to write the outstanding data to the set of pages.

In an example, the controller may determine that there is not enough outstanding data for the given data stream to fill a set of pages of a particular wordline. If there is not enough outstanding data for the given data stream to occupy the set of pages, the controller may issue a dual-plane cache program command to write the outstanding data for the given data stream to a subset of the set of pages. The subset of the set of pages may include at least one (1) page from each of at least two (2) planes of a particular NVM media. The particular NVM media may include four (4) or more planes, without limitation. The remaining pages of the set of pages may be utilized to store additional incoming data from the same data stream received from the host system.

In various examples, slow data may refer to data from a data stream associated with a relatively low queue depth (QD) workload. Fast data stream may refer to data from a data stream associated with a relatively high QD workload. The relatively high QD workload may be greater than the relatively low QD workload. A QD workload may correspond to a number of write requests associated with a given data stream. Accordingly, a slow data stream will be associated with less write requests than a fast data stream.

In another example, the controller may determine that there is not enough outstanding data of a first data stream to fill a set of pages of a particular wordline. The first data stream may be a slow data stream. Additionally, the controller may identify incoming data associated with a second data stream. The second data stream may be a fast data stream. The controller may issue a dual plane cache full sequence program to quickly process the outstanding data of the first data stream. Quickly processing the outstanding data of the first data stream may enable the controller to quickly switch to processing the incoming data of the second data stream. The dual plane cache full sequence program may separate the outstanding data of the first data stream into a first data portion and a second data portion. The first data portion may be sent to a first cache register of a first plane and a second cache register of a second plane associated with the wordline. The second data portion may be sent to a third cache register of a third plane and a fourth cache register of a fourth plane associated with the wordline. The controller may subsequently issue a dual plane program to write the first data portion to first pages of the first plane and second pages of the second plane. In parallel, the controller may issue a random data input to store the second data portion in third pages of the first plane and fourth pages of the fourth plane. The first data portion and the second data portion may be written to the corresponding pages of the planes in parallel. To reduce an amount programming time, the cache duel plane program and the random data input may be issued by the controller simultaneously, or nearly simultaneously. Accordingly, latency associated with writing from writing outstanding data of a slow stream to writing outstanding data of a fast stream on the same die be reduced.

In various examples, outstanding data of a slow data stream may be written to SLC pages associated with a set of SLC wordlines. After filling the SLC pages associated with the outstanding data of the slow data stream, the controller may issue an internal copyback command to copy the data from the set of SLC pages to a second set of pages of a higher-level cell wordline, such as an MCL wordline, a TLC wordline, or a QLC wordline, without limitation. Accordingly, the data of the slow data stream may be written to and read from the SLC pages and relatively long buffering times may be avoided.

In various examples, the controller may include a plurality of minimum write cache control buffers (mWCCBs). The controller may assign a pair of mWCCBs to each of a plurality of data streams. The mWCCBs may have a data capacity equivalent to a page size multiplied by a number of pages associated with a wordline. For example, if the page size is 16 KB and three pages of each plane are included in a wordline (i.e. a TLC wordline), the size of each mWCCB may be 48 KB. In various examples, a first portion of outstanding data of a given data stream may be temporarily stored in a first mWCCB. A second portion of outstanding data of the given data stream may be temporarily stored in a second mWCCB. The first portion of the outstanding data may be released to the memory device in coordination with storing the second portion in the second mWCCB. The second mWCCB may be filled with the second portion of the outstanding data while the first portion of the outstanding data stored in the first mWCCB is being released, and vice-versa. The mWCCBs may be released and reused a number of times before a set of pages of the wordline may be filled with data. Accordingly, the granularity at which the mWCCBs may be released and reused may be reduced compared to conventional buffering techniques. The reduced granularity of releasing and reusing the mWCCBs may reduce a volatile buffer size requirement of the data storage system without incurring significant impact on write performance. Limiting the volatile write cache size requirement may enhance power loss protection (PLP) protection and limit on-chip device capacitance.

FIG. 1 illustrates an example system 100 including a host system 102 and a data storage system 104. The data storage system 104 may include a controller 106. The controller 106 may include a processor 108, a local memory 110, a variable plane programming component 112, and a plurality of minimum write cache control buffers (mWCCBs) 113. The data storage system 104 may also include a memory device 114. The memory device 114 may include a plurality of non-volatile memory (NVM) media 116 and one or more local controller(s) 118.

In various examples, a read or write request may be received from the host system 102 via a peripheral component interconnect express (PCIe) interface that connects the data storage system 104 to servers or CPUs. PCIe is a standardized interface for motherboard components. The controller 106 may use logical block addresses (LBAs) and physical block addresses (PBAs) to facilitate access for data storage in and retrieval from the NVM media 116. LBAs are an abstraction to allow the operating system to interact with the NVM media 116, and PBAs represent the actual hardware locations within the NVM media 116. To facilitate interacting with the NVM media 116, the controller 106 may create an entry or record that assigns an LBA to a PBA. To keep track of all such LBA-to-PBA assignments, the controller 106 may use a logical-to-physical (L2P) mapping table. The L2P table may be uploaded to the local memory 110 so that it can be more quickly accessed and updated by the controller 106. In various examples, the local memory 110 may include a synchronous dynamic random access memory (SDRAM), without limitation. In various examples, the mWCCBs 113 may be contained within the local memory 110 or may be physically separate from the local memory 110, without limitation.

When a data request is received from the host system 102, the controller 106 references the L2P mapping table to determine the PBA within the NVM media 116 corresponding to a desired LBA. Once the PBA is determined, the controller 106 accesses the appropriate NVM media 116 to write or read the data. Access to the NVM media 116 may be via a flash physical (PHY) interface. The controller 106 may employ an error correction code (ECC) operation during encoding and decoding data to detect and correct errors and enhance data integrity. Additionally, the memory device 114 may support a direct memory access (DMA) operation enabling data to be written from the host system 102 directly to the NVM media 116 and read from the NVM media 116 directly to the host system 102. Certain commands may be issued to the controller 106 or the local controller(s) 118 using the host command layer, or non-volatile memory express management interface (NVMe-MI).

The controller 106 may assign a pair of the mWCCBs 113 to each of a plurality of data streams. The mWCCBs 113 may have a data capacity equivalent to a page size multiplied by a number of pages associated of a wordline. For example, if the page size is 16 KB and three pages of each plane are included in a wordline (i.e. a TLC wordline), the size of each mWCCB 113 may be 48 KB. In various examples, a first portion of outstanding data of a first data stream may be temporarily stored in a first mWCCB 113. A second portion of the outstanding data of the first data stream may be temporarily stored in a second mWCCB 113. The first portion of the outstanding data may be released to the memory device in coordination with storing the second portion in the second mWCCB 113. The second mWCCB 113 may be filled with the second portion of the outstanding data while the first portion of the outstanding data stored in the first mWCCB 113 is being released, and vice-versa. In various examples, the first and second portions of the outstanding data may include an entire of the outstanding data. In some examples, additional outstanding data for the first data stream may be received and/or identified concurrently or subsequently to storing and releasing the first and second portions of the outstanding data form the first and second mWCCBs 113. The mWCCBs 113 may be released and reused a number of times before a set of pages of a wordline may be filled with outstanding data. Accordingly, the granularity at which the mWCCBs 113 may be released and reused may be reduced compared to conventional buffering techniques. The reduced granularity of releasing and reusing the mWCCBs 113 may reduce a volatile buffer size requirement of the data storage system without incurring significant impact on write performance. Limiting the volatile write cache size requirement may enhance power loss protection (PLP) protection and limit on-chip device capacitance.

The variable plane programming component 112 may be operable to manage programming operations for writing data to the NVM media 116. The variable plane programming component 112 may receive outstanding data from the host system 102. The outstanding data may be associated with respective data streams. Each data stream may provide different amounts of data to be stored in the memory device 114. The variable plane programming component 112 may identify outstanding data of a given data stream based on respective identifiers (IDs) included in the outstanding data. The variable plane programming component 112 may identify an amount of outstanding data (i.e., data requested to be written to the memory device 114) for each of the data streams. In various examples, the variable plane programming component 112 may determine whether there is enough outstanding data for a given data stream to fill a set of pages of a particular wordline of the memory device 114. If the variable plane programming component 112 determines that there is enough outstanding data for the given data stream to fill the set of pages of the particular wordline, the variable plane programming component 112 may issue a random data input command to process the outstanding data. After issuing the random data input command, the variable plane programming component 112 may issue a multi-plane full sequence program to write the data to the set of pages.

In an example, the variable plane programming component 112 may determine that there is not enough data for a first data stream to fill a set of pages of a particular wordline of the memory device 114. If there is not enough data for the first data stream to occupy the set of pages, the variable plane programming component 112 may issue a dual-plane cache program to write the outstanding data for the first data stream to a subset of the set of pages. The subset of the set of pages may include at least one (1) page from each of at least two (2) planes of a particular NVM media 116. The remaining pages of the set of pages may be utilized to store data from the same data stream at a later time.

In another example, the variable plane programming component 112 may determine that there is not enough outstanding data of a first data stream to fill a set of pages of a particular wordline. The first data stream may be a slow data stream. Additionally, the variable plane programming component 112 may identify second incoming data associated with a second data stream. The second data stream may be a fast data stream. The variable plane programming component 112 may issue a cache full sequence program to process the outstanding data of the first data stream. The cache full sequence program may separate the outstanding data of the first data stream into a first data portion and a second data portion. The first data portion may be sent to a first cache register of a first plane and a second cache register of a second plane associated with a wordline. The second data portion may be sent to a third cache register of a third plane and a fourth cache register of a fourth plane associated with the wordline. The variable plane programming component 112 may subsequently issue a dual plane program to write the first data portion to first pages of the first plane and second pages of the second plane. The variable plane programming component 112 may issue a random data input program command to write the second data portion to third pages of the third plane and fourth pages of the fourth plane. The plane programming component 112 may issue the dual plane program command and the random data input program command simultaneously, or nearly simultaneously. The first data portion and the second data portion may be written to the corresponding pages in parallel.

A first portion of the incoming data may be temporarily stored in a third mWCCB 113 of the memory device. A second portion of the outstanding data may be temporarily stored in a fourth mWCCB 113 of the memory device. The first portion of the incoming data may be released from the third mWCCB 113 to the memory device in coordination with storing the second portion of the incoming data in the fourth mWCCB 113, as described with respect to the first and second mWCCBs 113. The variable plane programming component 112 may issue a random data input command to process the incoming data of the second data stream. Subsequent to issuing the random data input and dual plane cache program commands for writing the outstanding data of the first data stream to the memory device 114, the variable plane programming component 112 may issue a random data input command to write the incoming data of the second data stream to pages of a second set of planes associated with a second wordline. Accordingly, latency associated with writing from writing data of a slow stream to writing data of a fast stream on the same die be reduced.

In various examples, outstanding data of a slow data stream may be written to SLC pages associated with a plurality of SLC wordlines. After filling the SLC pages associated with the outstanding data of the slow data stream, the variable plane programming component 112 may issue an internal copyback command to copy the data from the set of SLC pages to a second set of pages of a higher-level cell wordline, such as an MCL wordline, a TLC wordline, or a QLC wordline, without limitation. Accordingly, the data of the slow data stream may be written to and read from the SLC pages and relatively long buffering times may be avoided.

In various examples, instructions for executing the variable plane programming component 112 may be stored in the local memory 110. Some or all functions of the variable plane programming component 112 may be executed by the processor 108, the local controller(s) 118, other circuitry of the controller 106 and/or memory device 114, or a combination thereof. The variable plane programming component 112 enables various different programming operations to be used depending on the amount of outstanding data to be stored for a given stream, which may enable the volatile buffer size to be reduced and may reduce latency in read and write processes.

Figure 2:
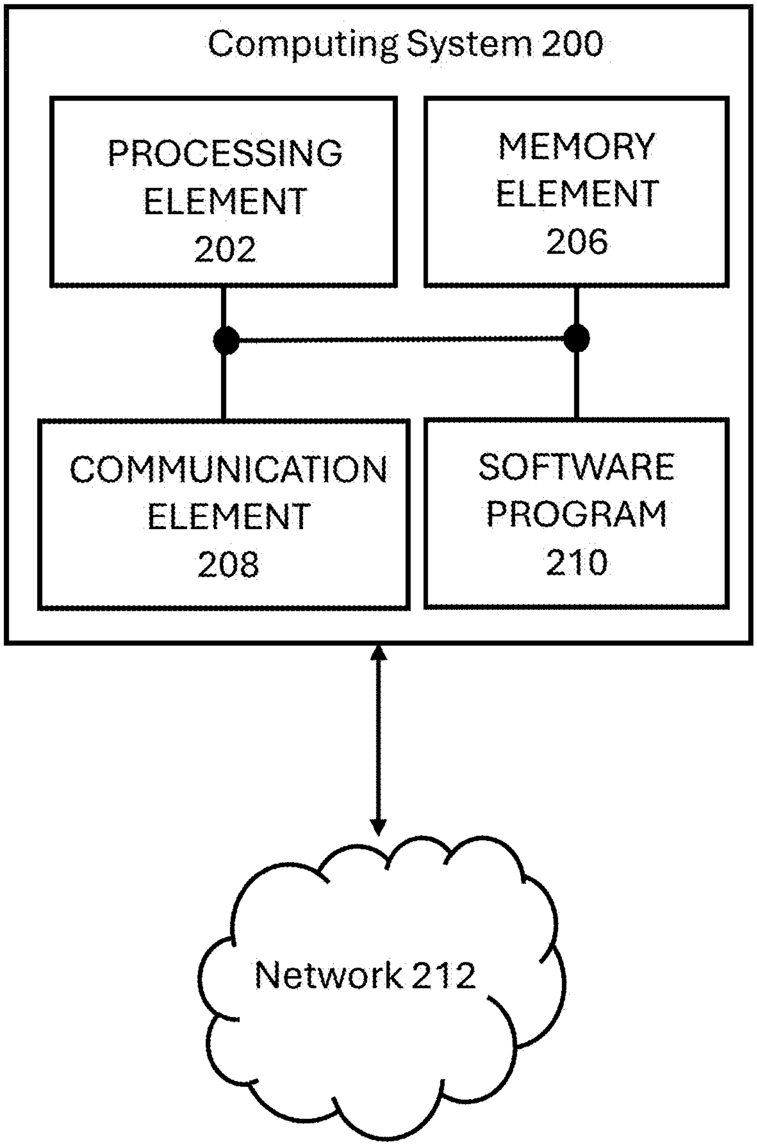
FIG. 2 illustrates an example computing system of the system of FIG. 1 connected to a communication network.

FIG. 2 illustrates a computing system 200 connected to a communication network 212. The computing system 200 may include at least one processing element 202, at least one memory element 206, a communication element 208, and a software program 210. In various examples, the computing system 200 may be a host system (e.g. the host system 102 of FIG. 1) and/or a data storage system (e.g. the data storage system 104 of FIG. 1), without limitation.

The software program 210 may be configured with instructions for performing and/or enabling performance of at least some of the steps set forth herein. In an embodiment, the software program 210 comprises instructions stored on computer-readable media of memory element 206. In various examples, the software program 210 may include instructions for performing operations of the variable plane programming component 112 discussed with reference to FIG. 1.

The communication network 212 generally allows communication between the computing system 200 and another computing device, such as between a remote host system (e.g. the host system 102), a local host system, and/or a data storage system (e.g. the data storage system 104 of FIG. 1), without limitation.

The communication network 212 may include the Internet, cellular communication networks, local area networks, metro area networks, wide area networks, cloud networks, plain old telephone service (POTS) networks, and the like, or combinations thereof. The communication network 212 may be wired, wireless, or combinations thereof and may include components such as modems, gateways, switches, routers, hubs, access points, repeaters, towers, and the like. The computing system 200 may, for example, connect to the communication network 212 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

The communication element 208 generally allows communication between the computing system 200 and the communication network 212. The communication element 208 may include signal or data transmitting and receiving circuits, such as antennas, amplifiers, filters, mixers, oscillators, digital signal processors (DSPs), and the like. The communication element 208 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the communication element 208 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 208 may establish communication through connectors or couplers that receive metal conductor wires or cables, like Cat 6 or coax cable, which are compatible with networking technologies such as ethernet. In certain embodiments, the communication element 208 may also couple with optical fiber cables. The communication element 208 may respectively be in communication with the processing element 202 and/or the memory element 206.

The memory element 206 may include electronic hardware data storage components such as read-only memory (ROM), programmable ROM, erasable programmable ROM, random-access memory (RAM) such as static RAM (SRAM) or dynamic RAM (DRAM), solid state drives (SSDs), cache memory, hard disks, floppy disks, optical disks, flash memory, thumb drives, universal serial bus (USB) drives, or the like, or combinations thereof. In some embodiments, the memory element 206 may be embedded in, or packaged in the same package as, the processing element 202. The memory element 206 may include, or may constitute, a "computer-readable medium." The memory element 206 may store the instructions, code, code segments, software, firmware, programs, applications, apps, services, daemons, or the like that are executed by the processing element 202. In an embodiment, the memory element 206 respectively store the software applications/ program 210. The memory element 206 may also store settings, data, documents, sound files, photographs, movies, images, databases, and the like. In various examples, the memory element 206 may include a first memory component (e.g. the local memory 110 of FIG. 1) and one or more SSDs (e.g. the memory device 114 of FIG. 1).

The processing element 202 may include electronic hardware components such as processors. The processing element 202 may include digital processing unit(s). The processing element 202 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 202 may generally execute, process, or run instructions, code, code segments, software, firmware, programs, applications, apps, processes, services, daemons, or the like. For instance, the processing element 202 may respectively execute the software applications/program 210. The processing element 202 may also include hardware components such as finite-state machines, sequential and combinational logic, and other electronic circuits that can perform the functions necessary for the operation of the current disclosure. The processing element 202 may be in communication with the other electronic components through serial or parallel links that include universal busses, address busses, data busses, control lines, and the like.

Through hardware, software, firmware, or various combinations thereof, the processing element 202 may—alone or in combination with other processing elements—be configured to perform the operations of embodiments of the present disclosure. The embodiments described herein in connection with the attached drawing figures are intended to describe aspects of the disclosure in sufficient detail to enable those skilled in the art to practice the disclosure. Other embodiments can be utilized and changes can be made without departing from the scope of the present disclosure. The system may include additional, less, or alternate functionality and/or device(s), including those discussed elsewhere herein. The above detailed description is, therefore, not to be taken in a limiting sense. The scope of the present disclosure is defined only by the appended claims, along with the full scope of equivalents to which such claims are entitled, unless otherwise expressly stated and/or readily apparent to those skilled in the art from the description.

Figure 3:
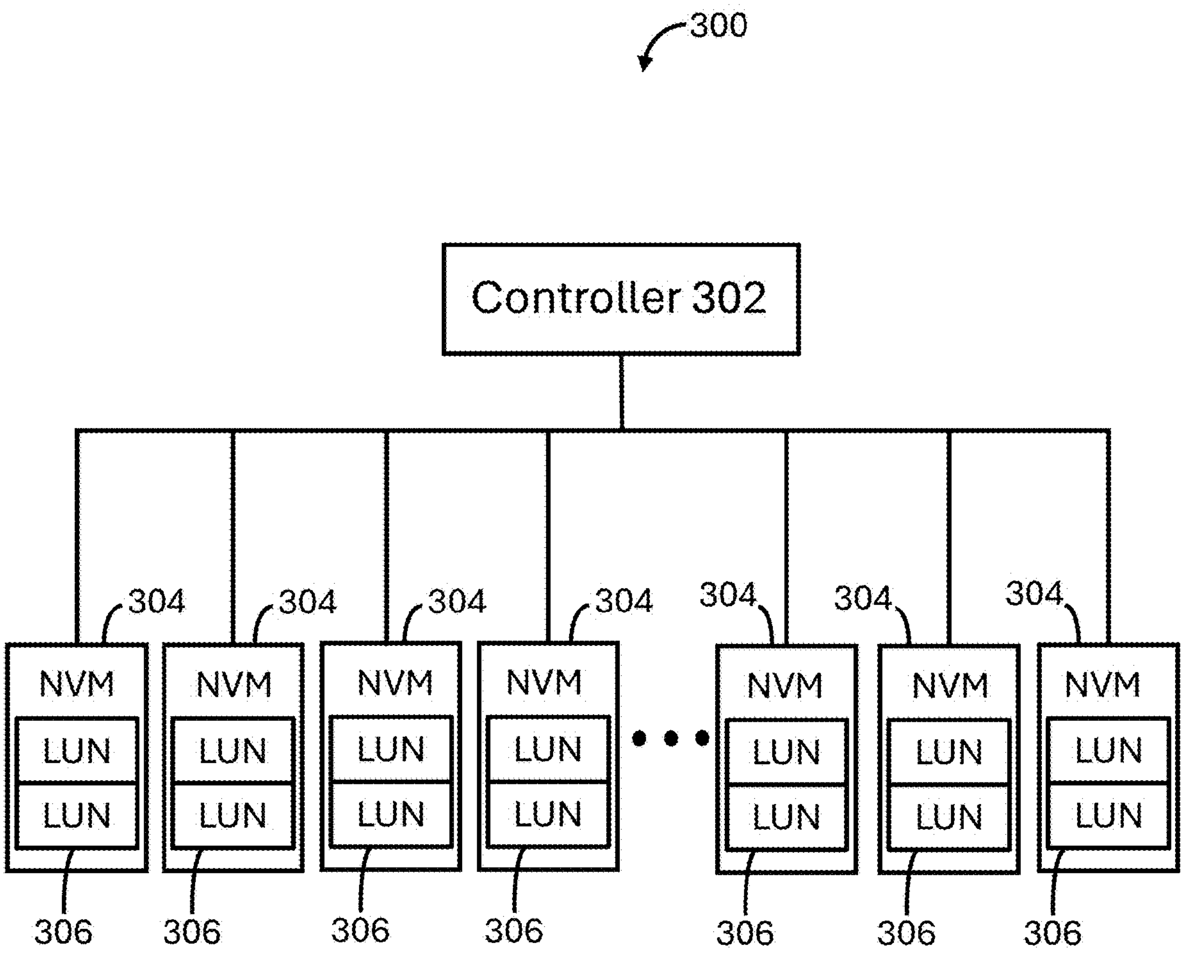
FIG. 3 illustrates an example data storage system of the system of FIG. 1.

FIG. 3 illustrates an example data storage system 300 including a controller 302 and a plurality of NVM media 304. In various examples, the data storage system 300 may correspond to the data storage system 104 of FIG. 1, the controller 302 may correspond to the controller 106 of FIG. 1, and the NVM media 304 may correspond to the NVM media 116 of FIG. 1, without limitation. In various examples, the NVM media 304 may each include two LUNs 306. It would be appreciated by one of ordinary skill in the art that each NVM 304 may include more than two LUNs, without limitation. Each LUN 306 may correspond to a respective die of the NVM media 304. In various examples, the controller 302 may write outstanding data to more than one NVM media 304 in parallel. The NVM media 304 may write outstanding data to more than one LUN 306 in parallel.

Figure 4:
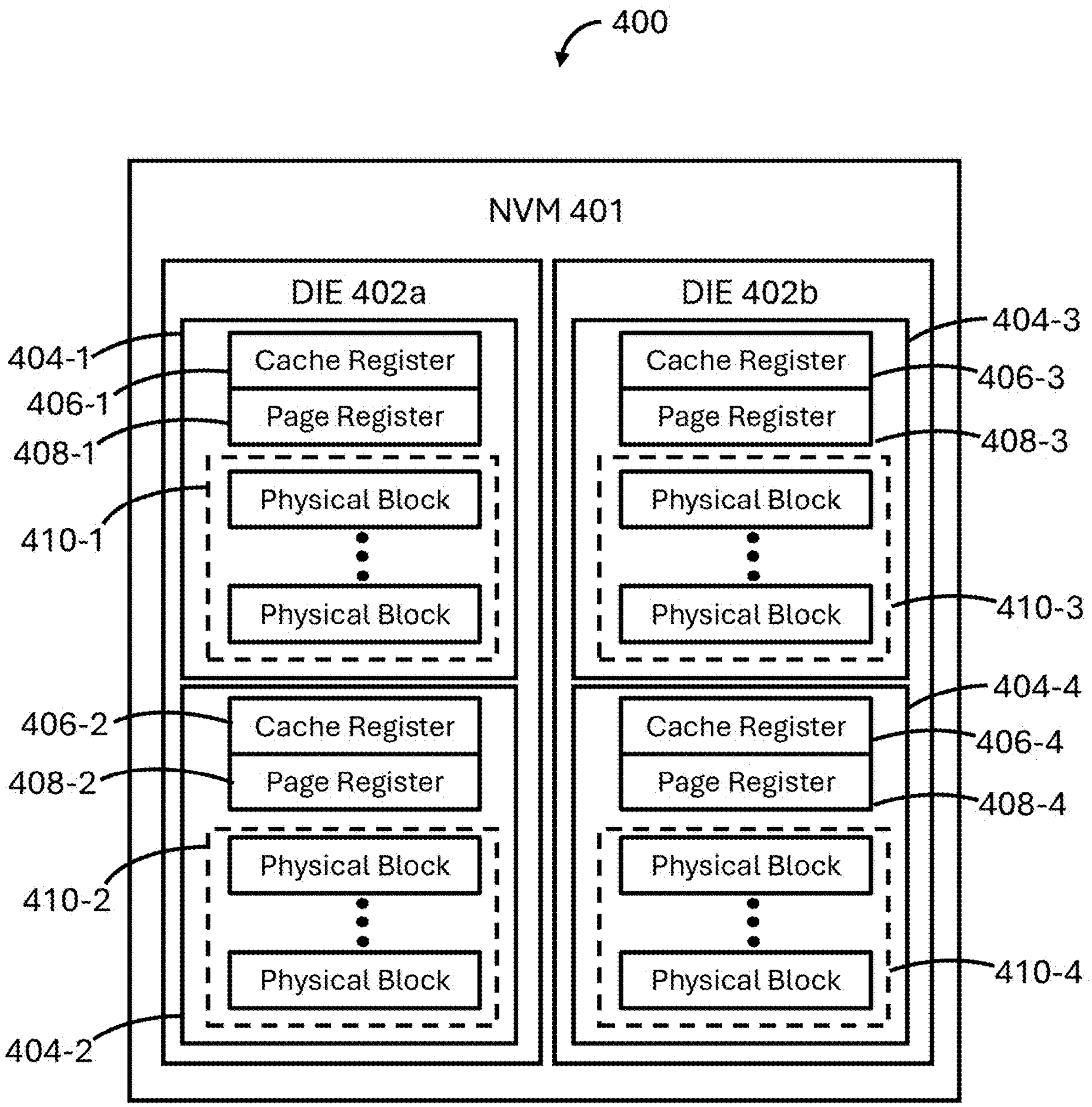
FIG. 4 illustrates an example non-volatile memory (NVM) media of the data storage system of FIG. 1.

FIG. 4 illustrates an example NVM media 400. The NVM 400 may correspond to the NVM media 116 of FIG. 1 and/or the NVM media 304 of FIG. 3, without limitation. The NVM media 400 may include a die 402*a* and a die 402*b*. Each of the die 402*a*, 402*b* may correspond to a respective LUN. The die 402*a* may include a plane 404-1 and a plane 404-2. The plane 404-1 may include a cache register 406-1, a page register 408-1, and physical blocks 410-1. The plane 404-2 may include a cache register 406-2, a page register 408-2, and physical blocks 410-2. The die 402*b* may include a plane 404-3 and a plane 404-4. The plane 404-3 may include a cache register 406-3, a page register 408-3, and physical blocks 410-3. The plane 404-4 may include a cache register 406-4, a page register 408-4, and physical blocks 410-4. It would be appreciated by one of ordinary skill in the art that the NVM media 400 may include more than two (2) die and each die may include more than two (2) planes. In various examples, the NVM media 400 may include two (2), four (4), eight (8), sixteen (16), twenty four (24), thirty two (32), or more die, without limitation. Each die may include, for example, four (4), six (6), eight (8), or more planes, without limitation.

When data is written to or retrieved from the die 402*a* or the die 402*b*, the data may be temporarily stored in one of the cache registers 406-1, 406-2, 406-3, 406-4 and/or page registers 408-1, 408-2, 408-3, 408-4. The cache registers 406-1, 406-2, 406-3, 406-4 and the page registers 408-1, 408-2, 408-3, 408-4 may respectively have an equivalent data capacity of one page. Accordingly, data to be written to one page of one of the physical blocks 410-1 may be temporarily stored in the cache register 406-1 while data to be written to another page of one of the physical blocks 410-1 may be temporarily stored in the page register 408-1. Data to be read from a page of one of the physical blocks 410-1 may be retrieved and temporarily stored in one of the cache register 406-1 while data is being read from another page of the physical blocks 410-1 to the page register 408-1 while data to be written to a particular page may be stored in the other of the cache register 406-1 and the page register 408-1. Accordingly, the cache register and page register enable double buffering of data to reduce data programming and read times. Each page may include a plurality of cells. Data bits may be written to the plurality of cells on a page-by-page basis. Data may be erased from the plurality of cells on a physical block basis.

Figure 5:
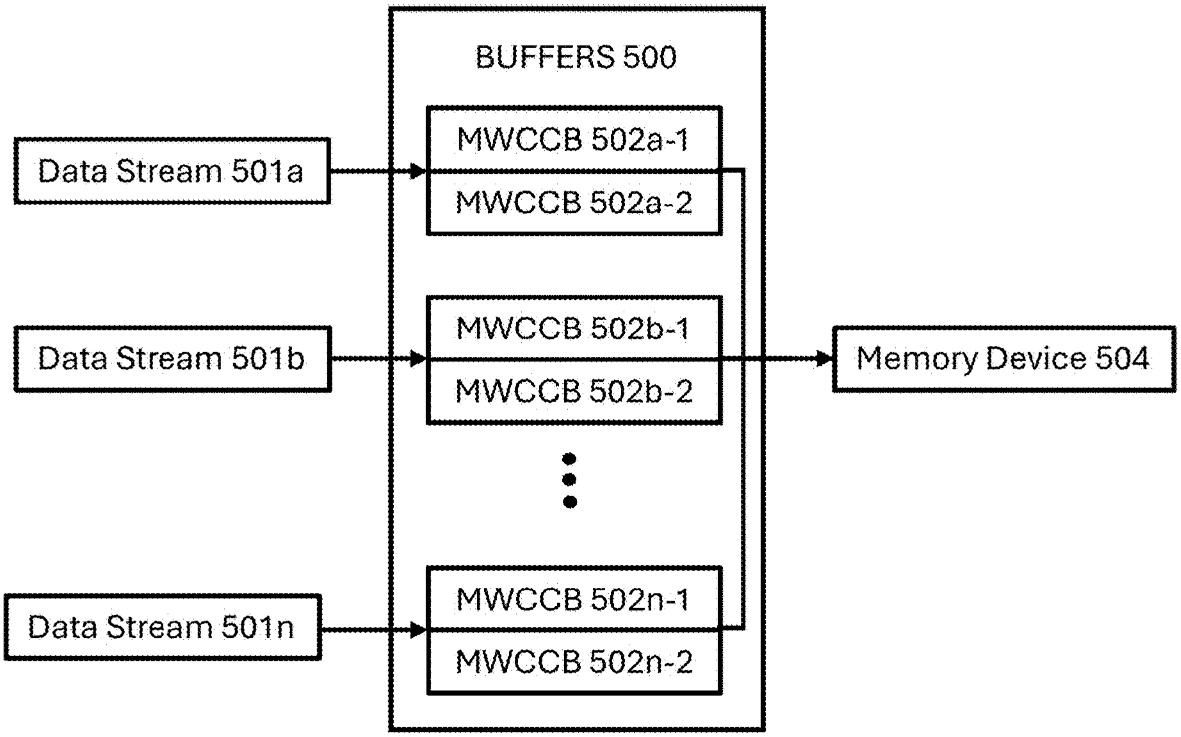
FIG. 5 illustrates example buffers operable to receive data from a plurality of data streams and provide the data to a memory device of the system of FIG. 1.

FIG. 5 illustrates example buffers 500 operable to receive outstanding data from a plurality of data streams 501*a*, 501*b*, . . . 501*n*, and provide the outstanding data to a memory device 504 (e.g. the memory device 114 of FIG. 1). The buffers 500 may correspond to the mWCCBs 113 of FIG. 1. The buffers 500 may include minimum write cache control buffers (mWCCBs) 502*a*-1, 502*a*-2, 502*b*-1, 502*b*-2, . . . 502*n*-1, 502*n*-2.

A controller (e.g. the controller 106 of FIG. 1) may assign a pair of buffers 500 to each of a plurality of data streams. The mWCCBs 502*a*-1, 502*a*-2 may be assigned to a data stream 501*a*. The mWCCBs 502*b*-1, 502*b*-2 may be assigned to a data stream 501*b*. The mWCCBs 502*n*-1, 502*n*-2 may be assigned to a data stream 501*n*.

The mWCCBs 502*a*-1, 502*a*-2, 502*b*-1, 502*b*-2, . . . 502*n*-1, 502*n*-2 may have a data capacity equivalent to a page size multiplied by a number of pages of a wordline. For example, if the page size is 16 KB and three pages for each plane are included in a wordline (i.e. a TLC wordline), the size of each mWCCB 502*a*-1, 502*a*-2, 502*b*-1, 502*b*-2, . . . 502*n*-1, 502*n*-2 may be 48 KB. In various examples, a first portion of outstanding data of the data stream 501*a* may be temporarily stored in the mWCCB 502*a*-1. A second portion of the outstanding data of the data stream 501*a* may be temporarily stored in the mWCCB 502*a*-2. The first portion of the outstanding data may be released to the memory device 504 from the mWCCB 502*a*-1 in coordination with storing the second portion of the outstanding data in the mWCCB 502*a*-2. The mWCCB 502*a*-2 may be filled with the second portion of the outstanding data while the first portion of the outstanding data stored first mWCCB 502*a*-1 is being released, and vice-versa. Outstanding data of the data streams 501*b*, . . . , 501*n* may be respectively stored in and released from the mWCCBs 502*b*-1, 502*b*-2, . . . 502*n*-1, 502*n*-2, in the same manner described above.

Because the data capacity of each pair of the mWCCBs 502*a*-1, 502*a*-2, 502*b*-1, 502*b*-2, . . . 502*n*-1, 502*n*-2 is smaller than a data capacity of a corresponding wordline, each mWCCB 502*a*-1, 502*a*-2, 502*b*-1, 502*b*-2, . . . 502*n*-1, 502*n*-2 may be released and reused a number of times before a respective wordline is filled with outstanding data. Accordingly, the granularity at which the mWCCBs may be released and reused may be reduced compared to conventional buffering techniques. The reduced granularity of releasing and reusing the mWCCBs may reduce a volatile buffer size requirement of the data storage system without incurring significant impact on write performance. Limiting the volatile write cache size requirement may enhance power loss protection (PLP) protection and limit on-chip device capacitance.

FIG. 6A illustrates a triple level cell (TLC) wordline 600 spanning four (4) planes P0, P1, P2, P3. The TLC wordline 610 may include three (3) pages from each of the planes P0, P1, P2, P3. In various examples, when a multi-plane full sequence program is issued to the wordline 600, outstanding data may be written horizontally across the planes. Specifically, when executing the multi-plane full sequence program, outstanding data may be written, in order, to the lower page of plane P0, the lower page of plane P1, the lower page of plane P2, the lower page of plane P3, the middle page of plane P0, the middle page of plane P1, and so on.

FIG. 6B illustrates a triple level cell (TLC) wordline 610 panning four (4) planes P0, P1, P2, P3. The TLC wordline 610 may include three (3) pages from each of the planes P0, P1, P2, P3. When a dual-plane cache program command is issued to the TLC wordline 610, outstanding data may be written horizontally across a pair of planes. Specifically, when executing the dual-plane cache program command, outstanding data may be written, in order, to the lower page of plane P0, the lower page of plane P1, the middle page of plane P0, the middle page of plane P1, and so on.

When a dual plane program is issued to the wordline, outstanding data may be written in parallel to corresponding pages of a pair of planes, such as the lower, middle, and upper pages of the plane P0 and lower, middle, and upper pages of the plane P1. For example, a first portion of outstanding data may be written to the lower, middle, and upper pages of the plane P0 and the plane P1, and a second portion of the data may be written to the lower, middle, and upper pages of the plane P2 and the plane P3.

Figures 7A, 7B:
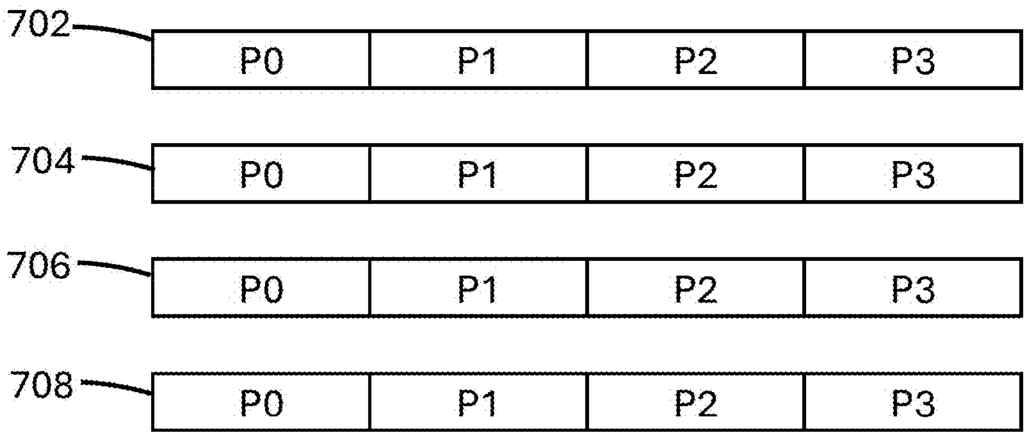
FIG. 7A illustrates example single level cell (SLC) multi-plane wordlines of the system of FIG. 1.
FIG. 7B illustrates an example quad level cell (QLC) multi-plane wordline of the system of FIG. 1.

FIG. 7A illustrates a plurality of single level cell (SLC) wordlines 702, 704, 706, and 708 spanning four (4) planes P0, P1, P2, P3. The SLC wordlines 702, 704, 706, 708 may include one (1) page from each of the planes P0, P1, P2, P3. In various examples, outstanding data of a slow data stream may be stored in the pages of the SLC wordlines 702, 704, 706, 708. Initially, there may not be enough outstanding data of the slow data stream to fill all pages of the SLC wordlines 702, 704, 706, 708. Over time, when all pages of the SLC wordlines 702, 704, 706, 708 have been filled with outstanding data of the slow data stream, the outstanding data may be copied over to pages of a higher level cell wordline, such as the QLC wordline of FIG. 7B.

FIG. 7B illustrates a QLC wordline 710. The QLC wordline 710 may include four (4) planes P0, P1, P2, P3. The QLC wordline 710 may include four (4) pages from each of the planes P0, P1, P2, P3. The pages may include a lower page, a middle page, an upper page, and a top page for each of the planes P0, P1, P2, P3. In various examples, an internal copyback command may be issued to copy data from a plurality of SLC wordlines (e.g. the SLC wordlines 702, 704, 706, 708 of FIG. 7A) to the QLC wordline. When a write command is issued (e.g. a multi-plane foggy fine, full sequence program, a dual-plane cache program, or a parallel dual-plane program, without limitation), data may be written to the pages of the QLC wordline 710 using an internal copyback command or in the manner described with reference to the TLC wordline 600 of FIG. 6A or the TLC wordline 610 of FIG. 6B, without limitation.

Figure 8:
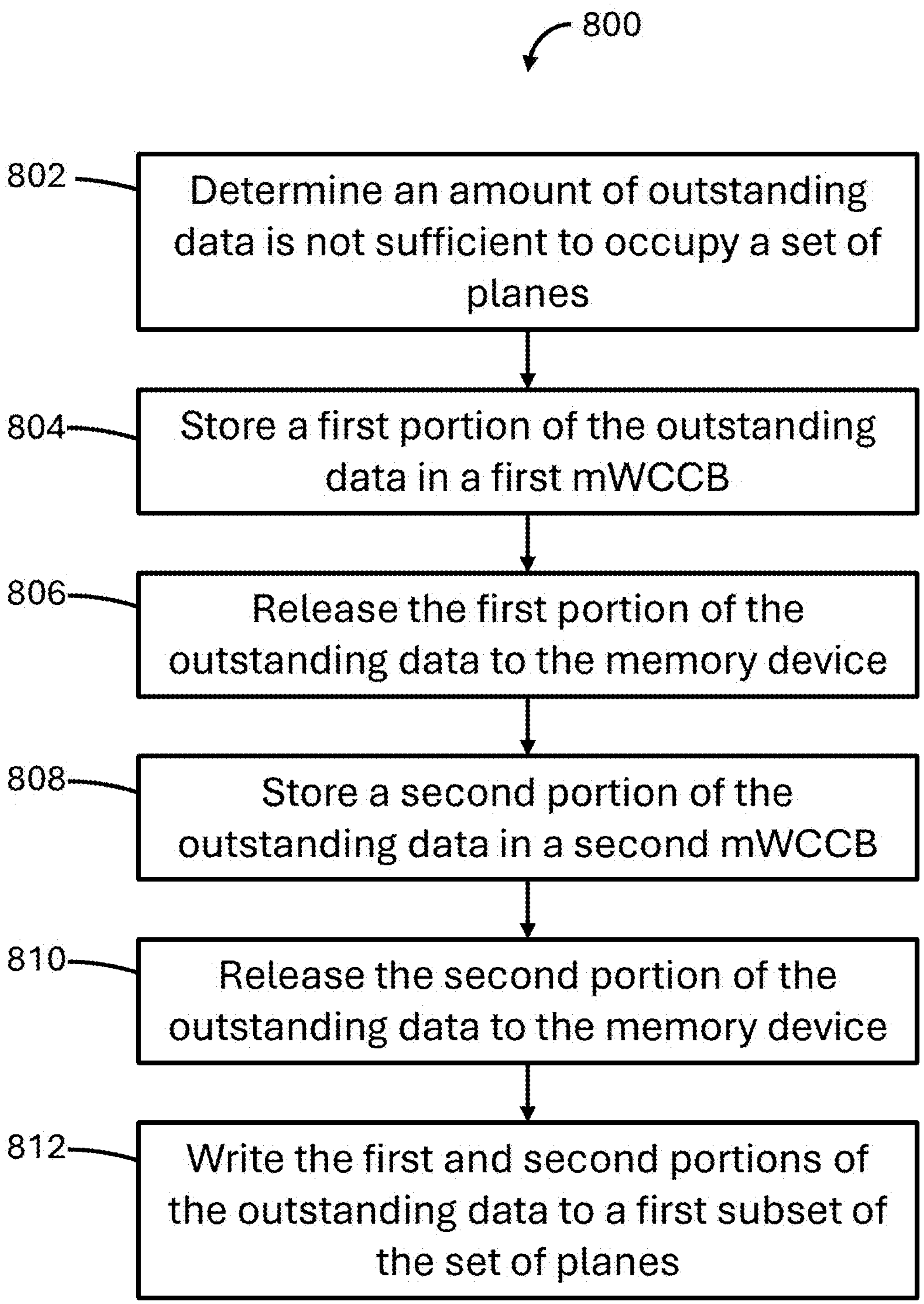
FIG. 8 illustrates an example method for configurable data placement with variable plane programming performed by the system of FIG. 1.

FIG. 8 illustrates an example method for configurable data placement with variable plane programming. The method may be performed by a controller (e.g. the controller 106 and/or controller(s) 118 of FIG. 1) of a memory storage system (e.g. the data storage system 104 of FIG. 1). The controller may manage storage and retrieval of data to and from a memory device (e.g. the memory device 114 of FIG. 1). The controller may receive read and write requests from a host system. Upon receiving a write request, the controller may facilitate writing data received from the host system to the memory device. Upon receiving a read request, the controller may facilitate reading of data from the memory device and communication of the data to the host system.

The memory device may include a plurality of NVM media (e.g. the NVM media 116 of FIG. 1). The NVM media may each include a plurality of LUNs (e.g. the LUNs 306 of FIG. 3). Each LUN may include a respective set of planes (e.g. the planes 404-1, 404-2, 404-3, 404-4 of FIG. 4). The respective sets of planes may each include a plurality of physical blocks (e.g. the physical blocks 410-1, 410-2, 410-3, 410-4 of FIG. 4.)

The memory device may include a plurality of wordlines. The wordlines may include SLC wordlines (e.g. the SLC wordlines 702, 704, 706, 708) and/or higher-level cell wordlines, such as multi-level cell (MLC) wordlines, TLC wordlines (e.g. the TLC wordline 610 of FIG. 6B) and/or QLC wordlines (e.g. the QLC wordline 710 of FIG. 7B). Each wordline may include a set of pages spanning multiple planes.

The controller may receive outstanding data associated with respective data streams. In various examples, outstanding data may be received from any number of data streams, such as four (4), eight (8), twelve (12), sixteen (16), twenty-four (24), thirty-two (32), or sixty-four (64) data streams, without limitation. Each data stream may provide different amounts of outstanding data to be stored in the memory device. The controller may identify outstanding data of a given data stream based on respective identifiers (IDs) included in the outstanding data.

The controller may identify an amount of outstanding data for each of the data streams. In various examples, the controller may determine whether there is enough outstanding data for a given data stream to fill a set of pages of a particular wordline. If the controller determines that there is enough outstanding data for the given data stream to fill the set of pages of the particular wordline, the controller may issue a random data input command to process the outstanding data. After issuing the random data input command, the controller may issue a multi-plane full sequence program to write the outstanding data to the set of pages.

At operation 802, the controller may determine that an amount of outstanding data of a first data stream is not sufficient to occupy a set of pages of a wordline of the memory device. The controller may identify the outstanding data of the first data stream based on an ID of the first data stream included in the outstanding data.

At operation 804, a first portion of the outstanding data may be stored in a first mWCCB. The first mWCCB may be included in the controller. The first mWCCB may have a data capacity equivalent to a data size of one page of the set of pages multiplied by a number of pages included in one of the set of planes. The first portion of the outstanding data may include sufficient data to fill the first mWCCB.

At operation 806, the first portion of the outstanding data may be released from the first mWCCB to the memory device.

At operation 808, a second portion of the outstanding data may be stored in the second mWCCB in coordination with the release of the first portion of the outstanding data from the first mWCCB. The second mWCCB may be included in the controller. The second mWCCB may have a data capacity equivalent to a data size of one page of the set of pages multiplied by a number of pages included in one of the set of planes. The second portion of the outstanding data may include sufficient data to fill the second mWCCB. The second mWCCB may be filled with outstanding data while the outstanding data stored in the first mWCCB is being released, and vice-versa.

At operation 810, the second portion of the outstanding data may be released from the second mWCCB to the memory device. In various examples, the first and second portions of the outstanding data may include an entire of the outstanding data. In some examples, additional outstanding data for the first data stream may be received and/or identified concurrently or subsequently to storing and releasing the first and second portions of the outstanding data form the first and second mWCCBs 113. If there is additional data of the first data stream to be stored in the memory device, the controller may temporarily store a further portion of outstanding data in the first mWCCB in coordination with, or subsequent to, the release of the second portion from the second mWCCB. This process (i.e. storing outstanding data in one mWCCB while releasing outstanding data form the other mWCCB) may be repeated until all outstanding data of the first data stream has been released to the memory device. In some examples, there may only be enough outstanding data of the first data stream to fill the first and second mWCCBs one time.

At operation 812, based on the determination that there is not sufficient outstanding data to occupy the set of pages of the wordline, the first and second portions of the outstanding data may be written to a subset of the set of pages. In various examples, the subset may include respective pages from a first pair of planes.

In an example, the controller may issue a dual-plane cache program to write the outstanding data for the first data stream to the subset. The subset may include at least one (1) page from each of at least two (2) planes of a particular NVM media. The particular NVM media may include four (4) or more planes, without limitation. The remaining pages of the set of pages may be utilized to store additional data from the first data stream at a later time.

In various examples, the first data stream may be a slow data stream. Additionally, the controller may identify incoming data of a second data stream. The second data stream may be a fast data stream. The controller may issue a cache dual plane full sequence program to process the outstanding data of the first data stream. The controller may separate the outstanding data of the first data stream into a first data portion and a second data portion. The first data portion may be sent to a first cache register of a first plane and a second cache register of a second plane associated with the wordline. The second data portion may be sent to a third cache register of a third plane and a fourth cache register of a fourth plane associated with the wordline. The controller may subsequently issue a cache dual plane program command to write the first data portion to first pages of the first plane and the second pages of the second plane. The controller may issue a random data input command to write the second data portion to third pages of the third plane and fourth pages of the fourth plane. The first data portion and the second data portion may be written to the corresponding pages in parallel. Subsequent to issuing the cache dual plane program command and the random data input command, the controller may process the incoming data of the second data stream. Processing the incoming data of the second data stream may include storing and releasing a first portion of the incoming data in a third mWCCB and a second portion of the incoming data in a fourth mWCCB, in the same manner described with respect to the first and second mWCCBs. A random data input program command may be issued to write the incoming data of the second data stream to a second set of planes of a second wordline of the memory device. Accordingly, latency associated with writing from writing outstanding data of a slow stream to writing outstanding data of a fast stream on the same die be reduced.

In a further example, the wordline may be a virtual wordline including a plurality of SLC wordlines. The first and second portions of outstanding data may be written to SLC pages of the plurality of SLC wordlines. The controller may receive additional outstanding data of the first data stream after writing the first and second portions of outstanding data to the SLC pages. The controller may temporarily store respective portions of the additional outstanding data in the first and second mWCCBs and release the data from the first and second mWCCBs to the memory device. The memory device may write the respective portions of the additional outstanding data to the SLC pages. Upon determining that the SLC pages have been filled by the additional outstanding data of the data stream, the controller may issue an internal copyback command to copy the outstanding data from the set of SLC pages to a second set of pages of a second wordline. The second wordline may be one of: an MLC wordline, a TLC wordline, and a QLC wordline, without limitation. The second set of pages may be one of: MLC pages, TLC pages, and QLC pages, without limitation. Accordingly, the outstanding data of the slow data stream may be written to and read from the SLC pages and relatively long buffering times may be avoided.

According to various examples of the present disclosure, a system may include a memory device and a controller. The memory device may include a set of planes and a wordline. The wordline may include a set of pages spanning the set of planes. The controller may include a first minimum write cache control buffer (mWCCB) and a second mWCCB, at least one processor, and a memory. The memory may include instructions stored thereon, that when executed by at least one processor, cause the at least one processor to: determine that an amount of outstanding data of a data stream is not sufficient to occupy the set of pages; store a first portion of the outstanding data in the first mWCCB; release the first portion of the outstanding data from the first mWCCB to the memory device; in coordination with the release of the first portion of the outstanding data, store a second portion of the outstanding data in the second mWCCB; release the second portion of the outstanding data from the second mWCCB to the memory device; and based on the determination that the amount of outstanding data is not sufficient to occupy the set of pages, write the first and second portions of the outstanding data to a first subset of the set of pages.

In combination with any of the previous examples, writing the first and second portions of the outstanding data to the first subset may include issuing a dual program cache program command to the wordline. The first and second portions of the outstanding data may include an entirety of the amount of outstanding data.

In combination with any of the previous examples, the first and second mWCCBs may respectively have a data capacity equivalent to a data size of one page of the set of pages multiplied by a number of pages of the wordline included in one of the sets of planes.

In combination with any of the previous examples, the set of planes may include a first pair of planes and a second pair of planes. Writing the first and second portions of the outstanding data to the first subset may include issuing a dual plane program command to write the first portion of the outstanding data to the pages of the first pair of plane and write the second portion of the outstanding data to the pages of the second pair of planes. The first and second portions of the outstanding data may include an entirety of the amount of outstanding data.

In combination with any of the previous examples, the memory device may include a second set of planes. The controller may include a third mWCCB and a fourth mWCCB. The instructions, when executed by the at least one processor, cause the at least one processor to: receive incoming data associated with a second data stream; temporarily store a first portion of the incoming data in the third mWCCB; release the first portion of the incoming data from the third mWCCB to the memory device; in coordination with releasing the first portion of the incoming data, temporarily store a second portion of the incoming data in the fourth mWCCB; release the second portion of the incoming data from the fourth mWCCB to the memory device; and write the first and second portions of the incoming data to the second set of planes.

In combination with any of the previous examples, the wordline may include a plurality of single level cell (SLC) wordlines including SLC pages spanning the plurality of planes. The subset may correspond to at least the SLC pages of one of the plurality of SLC wordlines. The memory device may include a second wordline including a second set of pages spanning a second set of planes. The instructions, when executed by the at least one processor, cause the at least one processor to: write additional outstanding data of the data stream to the plurality of SLC pages; determine that the plurality of multi-plane SLC pages have been filled by the outstanding data and the additional outstanding data; and issue an internal copyback command to copy the outstanding data and the further outstanding data to the second set of pages.

In combination with any of the previous examples, the second wordline may be one of: a multi-level cell (MLC) wordline, a triple level cell (TLC) wordline, and a quadruple-level cell (QLC) worldline. The second set of pages may be one of: MLC pages, TLC pages, and QLC pages.

According to various examples of the present disclosure, a computer-implemented method may include: determining an amount of outstanding data of a data stream is not sufficient to occupy a set of pages of a wordline of a memory device, said set of pages spanning a set of planes of the memory device; storing a first portion of the outstanding data in a first minimum write cache control buffer (mWCCB); releasing the first portion of the outstanding data from the first mWCCB to the memory device; in coordination with the release of the first portion of the outstanding data, store a second portion of the outstanding data in a second mWCCB; releasing the second portion of the outstanding data from the second mWCCB to the memory device; and based on the determination that the amount of outstanding data is not sufficient to occupy the set of planes, writing the first and second portions of the outstanding data to a first subset of the set of pages.

In combination with any of the previous examples, writing the first and second portions of the outstanding data to the first subset may include issuing a dual program cache program command to the wordline. The first and second portions of the outstanding data may include an entirety of the amount of outstanding data.

In combination with any of the previous examples, the first and second mWCCBs may respectively have a data capacity equivalent to a data size of one page of the set of pages multiplied by a number of pages of the wordline included in one of the set of planes.

In combination with any of the previous examples, the set of planes may include a first pair of planes plane and a second plane. Writing the first and second portions of the outstanding data to the first subset may include issuing a dual plane program command to write the first portion of the outstanding data to the pages of the first plane and write the second portion of the outstanding data to the pages of the second plane. The first and second portions of the outstanding data may include an entirety of the amount of outstanding data.

In combination with any of the previous examples, the method may include: receiving incoming data associated with a second data stream; temporarily storing a first portion of the incoming data in the third mWCCB; releasing the first portion of the incoming data from the third mWCCB to the memory device; in coordination with releasing the first portion of the incoming data, temporarily storing a second portion of the incoming data in the fourth mWCCB; releasing the second portion of the incoming data from the fourth mWCCB to the memory device; and writing the first and second portions of the incoming data to the second set of planes.

In combination with any of the previous examples, the wordline may include a plurality of single level cell (SLC) wordlines including SLC pages spanning the plurality of planes. The subset may correspond to at least the SLC pages of one of the plurality of SLC wordlines. The memory device may include a second wordline including a second set of pages spanning a second set of planes. The method may include: writing additional outstanding data of the data stream to plurality of SLC pages; determining that the plurality of multi-plane SLC pages have been filled by the outstanding data and the additional outstanding data; and issuing an internal copyback command to copy the outstanding data and the additional outstanding data to the second set of pages.

In combination with any of the previous examples, the second wordline may be one of: a multi-level cell (MLC) wordline, a triple level cell (TLC) wordline, and a quadruple-level cell (QLC) worldline. The second set of pages may be one of: MLC pages, TLC pages, and QLC pages.

According to various examples of the present disclosure, non-transitory computer readable media may include instructions stored thereon, that when executed by at least one processor, cause the at least one processor to: determine an amount of outstanding data of a data stream is not sufficient to occupy a set of pages of a wordline of a memory device, said set of pages spanning a set of planes of the memory device; store a first portion of the outstanding data in a first minimum write cache control buffer (mWCCB); release the first portion of the outstanding data from the first mWCCB to the memory device; in coordination with the release of the first portion of the outstanding data, storing a second portion of the outstanding data in a second mWCCB; release the second portion of the outstanding data from the second mWCCB to the memory device; and based on the determination that the amount of outstanding data is not sufficient to occupy the set of planes, write the first and second portions of the outstanding data to a first subset of the set of pages.

In combination with any of the previous examples, writing the first and second portions of the outstanding data to the first subset may include issuing a dual program cache program command to the wordline. The first and second portions of the outstanding data may include an entirety of the amount of outstanding data.

In combination with any of the previous examples, the first and second mWCCBs may respectively have a data capacity equivalent to a data size of one page of the set of pages multiplied by a number of pages of the wordline included in one of the set of planes.

In combination with any of the previous examples, the set of planes may include a first pair of planes and a second pair of planes. Writing the first and second portions of the outstanding data to the first subset may include issuing a dual plane program command to write the first portion of the outstanding data to the pages of the first pair of planes plane and a random data input program command to write the second portion of the outstanding data to the pages of the second pair of planes. The first and second portions of the outstanding data may include an entirety of the amount of outstanding data.

In combination with any of the previous examples, the controller may include a third mWCCB and a fourth mWCCB. The instructions, when executed by the at least one processor, cause the at least one processor to: receive incoming data associated with a second data stream; temporarily store a first portion of the incoming data in the third mWCCB; release the first portion of the incoming data from the third mWCCB to the memory device; in coordination with releasing the first portion of the incoming data, temporarily store a second portion of the incoming data in the fourth mWCCB; release the second portion of the incoming data from the fourth mWCCB to the memory device; and write the first and second portions of the incoming data to a second set of planes of the memory device.

In combination with any of the previous examples, the wordline may include a plurality of single level cell (SLC) wordlines including SLC pages spanning the plurality of planes. The subset may correspond to at least the SLC pages of one of the plurality of SLC wordlines. The memory device may include a second wordline including a second set of pages spanning a second set of planes. The second wordline may be one of: a multi-level cell (MLC) wordline, a triple level cell (TLC) wordline, and a quadruple-level cell (QLC) worldline. The second set of pages may be one of: MLC pages, TLC pages, and QLC pages. The instructions, when executed by the at least one processor, may cause the at least one processor to: write additional outstanding data of the data stream to plurality of SLC pages; determine that the plurality of multi-plane SLC pages have been filled by the outstanding data and the additional outstanding data; and issue an internal copyback command to copy the outstanding data and the additional outstanding data to the second set of pages.

In this description, references to “one embodiment”, “an embodiment”, “embodiments”, “an example”, “one example”, or “examples” mean that the feature or features being referred to are included in at least one embodiment or example of the technology. Separate references to “one embodiment”, “an embodiment”, “embodiments”, “an example”, “one example”, or “examples” in this description do not necessarily refer to the same embodiment or example and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein, unless otherwise expressly stated and/or readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term “processing element” or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

While the present disclosure has been described herein with respect to certain illustrated examples, those of ordinary skill in the art will recognize and appreciate that the present disclosure is not so limited. Rather, many additions, deletions, and modifications to the illustrated and described examples may be made without departing from the scope of the disclosure as hereinafter claimed along with their legal equivalents. In addition, features from one example may be combined with features of another example while still being encompassed within the scope of the disclosure as contemplated by the inventors.

What is claimed is:

1. A data storage system comprising:

a memory device including a set of planes and a wordline, said wordline including a set of pages spanning the set of planes; and a controller including a first minimum write cache control buffer (mWCCB), a second mWCCB, at least one processor, and a memory, said memory including instructions stored thereon, that when executed by the at least one processor, cause the at least one processor to:

determine that an amount of outstanding data of a data stream is not sufficient to occupy the set of pages;

store a first portion of the outstanding data in the first mWCCB;

release the first portion of the outstanding data from the first mWCCB to the memory device;

in coordination with the release of the first portion of the outstanding data, store a second portion of the outstanding data in the second mWCCB;

release the second portion of the outstanding data from the second mWCCB to the memory device; and based on the determination that the amount of outstanding data is not sufficient to occupy the set of pages, write the first and second portions of the outstanding data to a first subset of the set of pages, said set of planes including a first pair of planes and a second pair of planes, wherein writing the first and second portions of the outstanding data to the first subset includes issuing a dual plane program command to write the first portion of the outstanding data to the pages of the first pair of planes and issuing a random data input program command to write the second portion of the outstanding data to the pages of the second pair of planes, wherein the first and second portions of the outstanding data include an entirety of the amount of outstanding data.

2. The data storage system of claim 1, wherein writing the first and second portions of the outstanding data to the first subset includes issuing a dual plane cache program command to the wordline, wherein the first and second portions of the outstanding data include an entirety of the amount of outstanding data.

3. The data storage system of claim 1, said first and second mWCCBs respectively having a data capacity equivalent to a data size of one page of the set of pages multiplied by a number of pages of the wordline included in one of the set of planes.

4. The data storage system of claim 1, said memory device including a second set of planes, said controller including a third mWCCB and a fourth mWCCB, wherein the instructions, when executed by the at least one processor, cause the at least one processor to:

receive incoming data associated with a second data stream, temporarily store a first portion of the incoming data in the third mWCCB, release the first portion of the incoming data from the third mWCCB to the memory device, in coordination with releasing the first portion of the incoming data, temporarily store a second portion of the incoming data in the fourth mWCCB, release the second portion of the incoming data from the fourth mWCCB to the memory device, and write the first and second portions of the incoming data to the second set of planes.

5. The data storage system of claim 1, said wordline including a plurality of single level cell (SLC) wordlines including SLC pages spanning the set of planes, said first subset corresponding to at least the SLC pages of one of the plurality of SLC wordlines, said memory device including a second wordline including a second set of pages spanning a second set of planes, wherein the instructions, when executed by the at least one processor, cause the at least one processor to:

write additional outstanding data of the data stream to remaining ones of the SLC pages, determine that the SLC pages have been filled by the outstanding data and the additional outstanding data, and issue an internal copyback command to copy the outstanding data and the additional outstanding data to the second set of pages.

6. The data storage system of claim 5, wherein the second wordline is one of: a multi-level cell (MLC) wordline, a triple level cell (TLC) wordline, and a quadruple-level cell (QLC) wordline, wherein the second set of pages are one of: MLC pages, TLC pages, and QLC pages.

7. The data storage system of claim 1, the dual plane program command and the random data input program command being issued simultaneously such that the first and second data portions are written to the pages of the first and second pairs of planes in parallel.

8. A computer-implemented method, comprising:

determining an amount of outstanding data of a data stream is not sufficient to occupy a set of pages of a wordline of a memory device, said set of pages spanning a set of planes of the memory device;

storing a first portion of the outstanding data in a first minimum write cache control buffer (mWCCB);

releasing the first portion of the outstanding data from the first mWCCB to the memory device;

in coordination with the release of the first portion of the outstanding data, store a second portion of the outstanding data in a second mWCCB;

releasing the second portion of the outstanding data from the second mWCCB to the memory device; and based on the determination that the amount of outstanding data is not sufficient to occupy the set of planes, writing the first and second portions of the outstanding data to a first subset of the set of pages, said set of planes including a first plane and a second plane, wherein writing the first and second portions of the outstanding data to the first subset includes issuing a dual plane program command to write the first portion of the outstanding data to the pages of the first pair of planes and issuing a random data input program command to write the second portion of the outstanding data to the pages of the second pair of planes, wherein the first and second portions of the outstanding data include an entirety of the amount of outstanding data.

9. The computer-implemented method of claim 8, wherein writing the first and second portions of the outstanding data to the first subset includes issuing a dual plane cache program command to the wordline, wherein the first and second portions of the outstanding data include an entirety of the amount of outstanding data.

10. The computer-implemented method of claim 8, said first and second mWCCBs respectively having a data capacity equivalent to a data size of one page of the set of pages multiplied by a number of pages of the wordline included in one of the set of planes.

11. The computer-implemented method of claim 8, comprising:

receiving incoming data associated with a second data stream, temporarily storing a first portion of the incoming data in a third mWCCB, releasing the first portion of the incoming data from a third mWCCB to the memory device, in coordination with releasing the first portion of the incoming data, temporarily storing a second portion of the incoming data in a fourth mWCCB, releasing the second portion of the incoming data from the fourth mWCCB to the memory device, and writing the first and second portions of the incoming data to a second set of planes of the memory device.

12. The computer-implemented method of claim 8, said wordline including a plurality of single level cell (SLC) wordlines including SLC pages spanning the set of planes, said first subset corresponding to at least the SLC pages of one of the plurality of SLC wordlines, said memory device including a second wordline including a second set of pages spanning a second set of planes, the method comprising:

writing additional outstanding data of the data stream to remaining ones of the SLC pages, determining that the SLC pages have been filled by the outstanding data and the additional outstanding data, and issuing an internal copyback command to copy the outstanding data and the additional outstanding data to the second set of pages.

13. The computer-implemented method of claim 12, wherein the second wordline is one of: a multi-level cell (MLC) wordline, a triple level cell (TLC) wordline, and a quadruple-level cell (QLC) wordline, wherein the second set of pages are one of: MLC pages, TLC pages, and QLC pages.

14. The computer-implemented method of claim 8, the dual plane program command and the random data input program command being issued simultaneously such that the first and second data portions are written to the pages of the first and second pairs of planes in parallel.

15. Non-transitory computer readable media having instructions stored thereon, that when executed by at least one processor, cause the at least one processor to:

determine an amount of outstanding data of a data stream is not sufficient to occupy a set of pages of a wordline of a memory device, said set of pages spanning a set of planes of the memory device;

store a first portion of the outstanding data in a first minimum write cache control buffer (mWCCB);

release the first portion of the outstanding data from the first mWCCB to the memory device;

in coordination with the release of the first portion of the outstanding data, storing a second portion of the outstanding data in a second mWCCB;

release the second portion of the outstanding data from the second mWCCB to the memory device; and based on the determination that the amount of outstanding data is not sufficient to occupy the set of planes, write the first and second portions of the outstanding data to a first subset of the set of pages, said set of planes including a first pair of planes and a second pair of planes, wherein writing the first and second portions of the outstanding data to the first subset includes issuing a dual plane program command to write the first portion of the outstanding data to the pages of the first pair of planes and a random data program command to write the second portion of the outstanding data to the pages of the second pair of planes, wherein the first and second portions of the outstanding data include an entirety of the amount of outstanding data.

16. The non-transitory computer readable media of claim 15, wherein writing the first and second portions of the outstanding data to the first subset includes issuing a dual plane cache program command to the wordline, wherein the first and second portions of the outstanding data include an entirety of the amount of outstanding data.

17. The non-transitory computer readable media of claim 15, said first and second mWCCBs respectively having a data capacity equivalent to a data size of one page of the set of pages multiplied by a number of pages of the wordline included in one of the set of planes.

18. The non-transitory computer readable media of claim 15, wherein the instructions, when executed by the at least one processor, cause the at least one processor to:

receive incoming data associated with a second data stream, temporarily store a first portion of the incoming data in a third mWCCB, release the first portion of the incoming data from the third mWCCB to the memory device, in coordination with releasing the first portion of the incoming data, temporarily store a second portion of the incoming data in a fourth mWCCB, release the second portion of the incoming data from the fourth mWCCB to the memory device, and write the first and second portions of the incoming data to a second set of planes of the memory device.

19. The non-transitory computer readable media of claim 15, said wordline including a plurality of single level cell (SLC) wordlines including SLC pages spanning the set of planes, said first subset corresponding to at least the SLC pages of one of the plurality of SLC wordlines, said memory device including a second wordline including a second set of pages spanning a second set of planes, wherein the second wordline is one of: a multi-level cell (MLC) wordline, a triple level cell (TLC) wordline, and a quadruple-level cell (QLC) wordline, wherein the second set of pages are one of: MLC pages, TLC pages, and QLC pages, wherein the instructions, when executed by the at least one processor, cause the at least one processor to:

write additional outstanding data of the data stream to remaining ones of the SLC pages, determine that the SLC pages have been filled by the outstanding data and the additional outstanding data, and issue an internal copyback command to copy the outstanding data and the additional outstanding data to the second set of pages.

20. The non-transitory computer readable media of claim 15, the dual plane program command and the random data program command being issued simultaneously such that the first and second data portions are written to the pages of the first and second pairs of planes in parallel.

* * * * *